(12) United States Patent
Kuksenkov et al.

(10) Patent No.: US 7,970,028 B2
(45) Date of Patent: Jun. 28, 2011

(54) SYSTEM AND METHODS FOR SPECKLE REDUCTION

(75) Inventors: Dmitri Vladislavovich Kuksenkov, Painted Post, NY (US); Martin Hempstead, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 258 days.

(21) Appl. No.: 12/200,963

(22) Filed: Aug. 29, 2008

(65) Prior Publication Data

US 2009/0190618 A1 Jul. 30, 2009

Related U.S. Application Data

(60) Provisional application No. 61/024,802, filed on Jan. 30, 2008.

(51) Int. Cl.
*H01S 3/10* (2006.01)
*H01S 3/13* (2006.01)
*H01S 3/00* (2006.01)

(52) U.S. Cl. .......................... 372/33; 372/24; 372/29.02

(58) Field of Classification Search .................. 372/24, 372/29.02, 33
See application file for complete search history.

(56) References Cited

U.S. PATENT DOCUMENTS

| | | | |
|---|---|---|---|
| 4,511,220 A | 4/1985 | Scully | 350/403 |
| 5,233,460 A | 8/1993 | Partlo et al. | 359/247 |
| 6,011,643 A | 1/2000 | Wunderlich et al. | 359/279 |
| 6,323,984 B1 | 11/2001 | Trisnadi | 359/245 |
| 6,577,429 B1 | 6/2003 | Kurtz et al. | 359/279 |
| 6,600,590 B2 | 7/2003 | Roddy et al. | 359/287 |
| 6,897,992 B2 | 5/2005 | Kikuchi | 359/237 |
| 6,956,878 B1 | 10/2005 | Trisnadi | 372/27 |
| 7,030,383 B2 | 4/2006 | Babayoff et al. | 250/370.08 |
| 7,119,936 B2 | 10/2006 | Kowarz et al. | 359/224 |
| 7,136,159 B2 | 11/2006 | Tsai et al. | 356/237.5 |
| 7,166,017 B2 | 1/2007 | Minamihaba et al. | 451/36 |
| 7,187,500 B2 | 3/2007 | Chuang et al. | 359/618 |
| 7,193,765 B2 | 3/2007 | Christensen et al. | 359/279 |
| 7,214,946 B2 | 5/2007 | Babayoff et al. | 250/370.08 |
| 7,245,420 B2 | 7/2007 | Govorkov et al. | 353/37 |
| 2003/0034396 A1 | 2/2003 | Tsikos et al. | 235/454 |
| 2004/0165621 A1 | 8/2004 | Chuang et al. | 372/25 |
| 2006/0012842 A1 | 1/2006 | Abu-Ageel | 359/196 |
| 2006/0018025 A1 | 1/2006 | Sharon et al. | 359/618 |
| 2006/0023165 A1 | 2/2006 | Ishihara et al. | 353/20 |

(Continued)

FOREIGN PATENT DOCUMENTS

EP 1734711 A1 12/2006

OTHER PUBLICATIONS

Trisnadi, J.A. "Hadamard Speckle Contrast Reduction", Optics Letters, 2004, pp. 11-13, vol. 29.

*Primary Examiner* — Armando Rodriguez
(74) *Attorney, Agent, or Firm* — Gregory V. Bean

(57) ABSTRACT

A method of operating a laser source comprising is provided. The method reduces speckle contrast in a projected image by creating a plurality of statistically independent speckle patterns. The method comprises generating a plurality of sub-beams that define an optical mode. The method further comprises controlling the phase of selected sub-beams to continuously sequence the laser source through a plurality of orthogonal optical modes. The plurality of orthogonal modes create a corresponding number of statistically independent speckle patterns, thus reducing speckle contrast in a image projected using the laser source by time averaging.

23 Claims, 5 Drawing Sheets

U.S. PATENT DOCUMENTS

| | | | |
|---|---|---|---|
| 2006/0092515 A1 | 5/2006 | Kim et al. | 359/566 |
| 2006/0146896 A1 | 7/2006 | Park | 372/29.023 |
| 2007/0008519 A1 | 1/2007 | Naftali et al. | 356/237.2 |
| 2007/0058135 A1 | 3/2007 | Morikawa et al. | 353/30 |
| 2007/0086492 A1 | 4/2007 | Betin et al. | 372/9 |
| 2007/0133630 A1 | 6/2007 | Ha | 372/26 |
| 2007/0188716 A1 | 8/2007 | Hashimoto | 353/30 |
| 2007/0223091 A1 | 9/2007 | Lee | 359/494 |
| 2007/0273953 A1* | 11/2007 | Hwang et al. | 359/279 |
| 2008/0204847 A1* | 8/2008 | Kamm et al. | 359/238 |

* cited by examiner

SYSTEM AND METHODS FOR SPECKLE REDUCTION

CROSS REFERENCE TO RELATED APPLICATIONS

This application claims the benefit of U.S. Provisional Application Ser. No. 61/024,802, filed on Jan. 30, 2008, for Systems and Methods for Speckle Reduction. The present application is also related to copending and commonly assigned U.S. patent application Ser. No. 12/072,426, filed on Feb. 26, 2008, for Systems and Methods for Polarization Modulation of an Optical Signal, but does not claim priority thereto.

BACKGROUND OF THE INVENTION

Embodiments of the present invention relate to systems and methods for modulation of an optical signal. More specifically, embodiments of the present invention relate to the design and methods of operation of a laser source and laser projection system to reduce the presence of speckle that may be visible in a laser projection image. Speckle may result whenever a coherent light source is used to illuminate a rough surface, for example, a screen, or any other object that produces a diffused reflection or transmission.

Particularly, a multitude of small areas of the screen or other reflecting object scatter light into a multitude of reflected beams with different points of origination and different propagation directions. At an observation point, for example in the observer's eye or at the sensor of a camera, these beams interfere constructively to form a bright spot, or destructively to form a dark spot, producing a random granular intensity pattern known as speckle. Speckle may be characterized by the grain size and contrast, usually defined as a ratio of standard deviation to mean light intensity in the observation plane. For a large enough illuminated area and a small enough individual scattering point size, the speckle will be "fully developed," with a brightness standard deviation of 100%. If an image is formed on the screen using laser beams, such granular structure will represent noise, or a serious degradation of the image quality.

BRIEF SUMMARY OF THE INVENTION

According to one embodiment of the present invention, a method of operating a laser source is provided. According to the method, a plurality of sub-beams carrying common projection data that define an optical mode are generated. Speckle contrast in an image projected using a laser source is reduced by controlling the phase of the sub-beams to continuously sequence the laser source through a plurality of orthogonal optical modes.

BRIEF DESCRIPTION OF THE SEVERAL VIEWS OF THE DRAWINGS

The following detailed description of specific embodiments of the present invention can be best understood when read in conjunction with the following drawings, where like structure is indicated with like reference numerals and in which.

DETAILED DESCRIPTION

Figure 1:
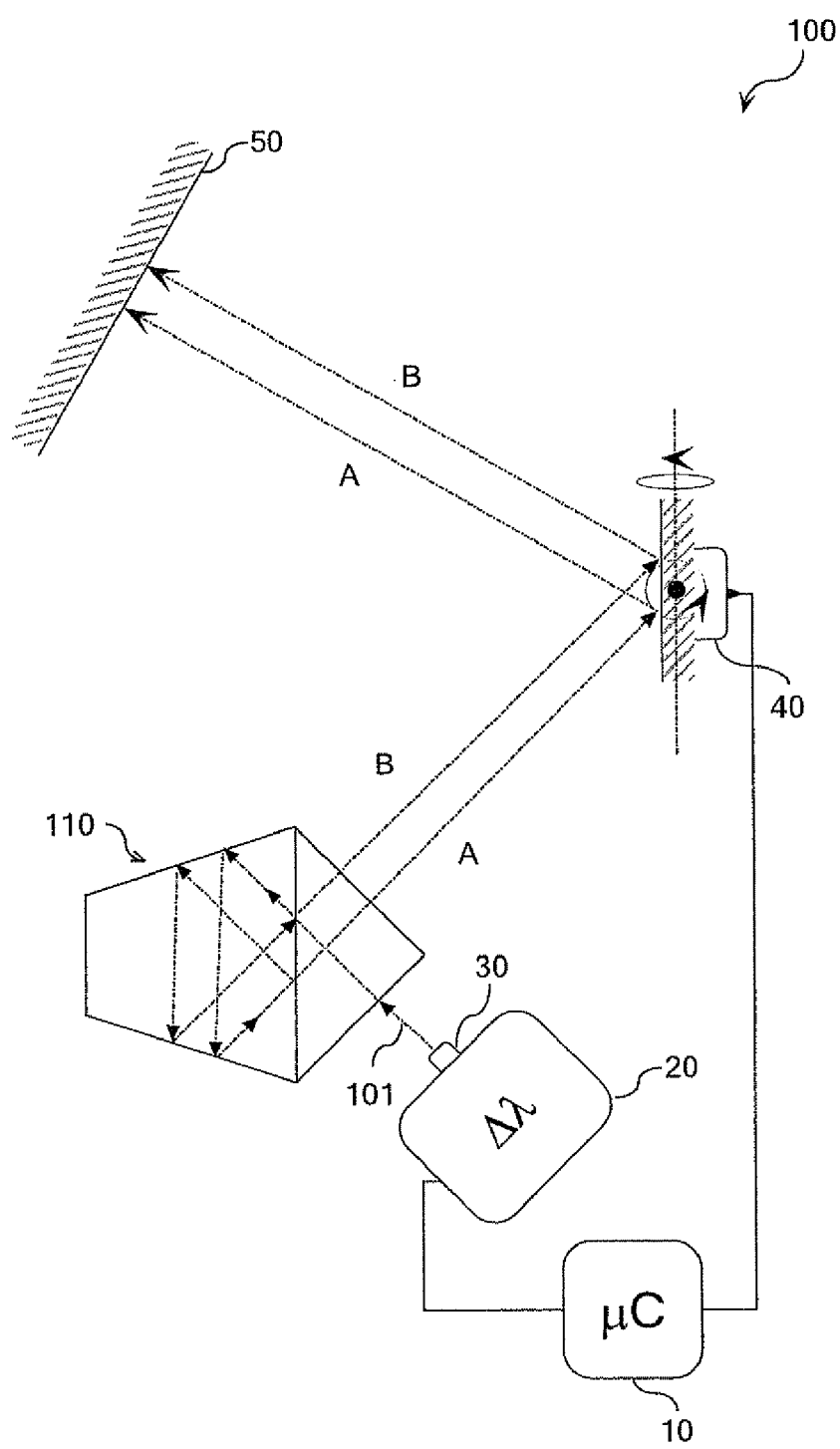
FIG. 1 is an illustration of a laser projection system according to one or more embodiments of the present invention.

Referring initially to FIG. 1, particular embodiments of the present invention can be described in the context of a laser projection system 100 comprising a laser 30, laser driver 20, laser projection optics 40, a system controller 10 and a projected image plane 50. The laser 30 may comprise semiconductor lasers, optically pumped solid state lasers, fiber lasers, or any other type of laser capable of small wavelength modulation. FIG. 1 illustrates the particular case where a laser projection system 100 is configured to operate as a scanning projector where the laser 30 generates one or more beams by frequency conversion, e.g., green laser beams, and/or one or more optical beams natively from semiconductor lasers, e.g., red and blue laser beams.

Speckle contrast present in an image generated by a laser projection system may be reduced by sequencing an optical signal generated by a laser source through a number of orthogonal optical modes. An optical mode may be defined as a set of two or more parallel sub-beams having approximately the same wavelength and specific relative optical phases. The sub-beams are projected onto a projection surface where they produce beam spots arranged in a specific pattern (for parallel beams, the spots will be arranged in-line, i.e., the line connecting the spot centers is a straight line). An eye resolution element is defined as the area on the screen within which intensity variation details cannot be resolved by the eye or camera at a given observation distance. For good perceived image quality, the number of pixels in the image and image size are typically chosen such that the individual pixel size is comparable to or smaller than the eye resolution area. For optimal operation of the present invention, it is required that the combined area of the spots be less than the area of an eye resolution element so that a human eye or camera perceives all of the spots as only one spot. Therefore, the combined area of the spots will typically also be smaller than the area of the individual pixel. The reduction of speckle is achieved by time-averaging. Since each orthogonal mode produces its own statistically independent speckle pattern, if the mode sequencing is done on a time scale faster than the persistence time of the human eye or integration time of the camera, the eye or camera will average two or more statistically independent speckle patterns and the speckle will appear less noticeable.

According to the present invention, wavelength modulation, beam splitting and optical delays may be utilized to cycle the laser source through a plurality of orthogonal modes to reduce speckle without degrading beam quality in a raster scanning system. As discussed in detail below, if an optical signal is split into a plurality of parallel sub-beams having an optical path length difference l therebetween, and the laser source is modulated so that the optical signal rapidly switches or oscillates between wavelengths separated by a wavelength difference $\Delta\lambda$, a plurality of parallel sub-beams having a fixed optical phase difference may be created. The plurality of sub-beams having one fixed optical phase difference is defined here as a single optical mode. Where the sub-beams are stationary (i.e., not scanning or moving across the screen), and the laser source is sequenced through a number of orthogonal modes, a speckle contrast reduction of $1/\sqrt{S}$ may be achieved, where S is the total number of spots on the screen produced by the sub-beams. However, in other embodiments, the sub-beams may be scanned across a screen to illuminate k illumination areas within the pixel. An illumination area may be defined as a set of beam spots generated by the stationary parallel sub-beams, or scanning sub-beams at a fixed moment in time. The sub-beams are cycled through each orthogonal mode at each illumination area before being scanned or moved to the next illumination area. In this non-stationary embodiment, a speckle contrast reduction of $1/\sqrt{kS}$ may be achieved.

Incorporating wavelength modulation as described herein drastically reduces a requisite optical path length difference l, enabling the use of a compact projection system 100 package. Without incorporating wavelength modulation, for example, the amount of delay required to exceed a coherence length (resulting in a random phase difference between sub-beams and therefore random sequencing of the optical modes projected onto the screen) may require too large of an optical path to be incorporated into a compact package. The present invention may be very compact and may achieve speckle contrast reduction without a significant change in optical signal quality. Thus, it is suitable for incorporation into miniature raster scanning laser projectors. Additionally, the wavelength modulation may be performed extremely fast, with a frequency comparable to or larger than the pixel rate of a scanned laser image. As such, the present invention is compatible with other slower speckle contrast reduction measures and may be used in conjunction with other such measures.

Referring again to FIG. 1, the laser 30 and laser projection optics 40 cooperate to generate a two-dimensional scanned laser image on a projection screen or projected image surface 50 utilizing the laser source's native optical signals, or signals generated by frequency conversion (e.g., by use of a frequency doubling crystal). The laser projection optics 40 may comprise, but are not limited to, a scanning mirror. A laser 30, for example a frequency doubled semiconductor laser, may emit an optical signal 101. As illustrated in FIG. 1, some embodiments may use a split and delay unit 110 to both split the optical signal into multiple sub-beams and create an optical path length difference l between each two adjacent sub-beams. For optimum image quality and speckle reduction, the sub-beams should usually be parallel. Upon entering the split and delay unit 110, the optical signal 101 may be split into at least two parallel sub-beams (e.g., sub-beam A and sub-beam B). The two parallel sub-beams are used here for illustrative purposes only, as any number of sub-beams may be generated. Sub-beam A and sub-beam B travel two different paths within the split and delay unit 110 such that there is an optical path length difference l between the two sub-beams. The optical signal 101 emitted by the laser 30 may be modulated to alternate or continuously sweep between two or more wavelengths, separated by a wavelength difference $\Delta\lambda$. After sub-beam A and sub-beam B exit the split and delay unit 110, sub-beam A and sub-beam B are redirected and scanned by scanning mirror 40, according to some embodiments. The sub-beams are then directed to the projected image surface 50.

A particular choice of a design for the split and delay unit 110 is not important for proper functioning of the present invention, so long as two or more parallel sub-beams are created and travel a different route to acquire the optical path length difference l. There are many split and delay unit 110 configurations that will effectively split the optical signal 101 into two or more parallel sub-beams as well as delay one or more of the sub-beams. Referring to FIGS. 2-6, a split and delay unit 110 splits the incoming optical signal 101 into at least two sub-beams with approximately equal power. The split and delay unit 110 may comprise one or more beam splitters that may be used to split the optical signal 101 into two or more sub-beams.

Figure 2:
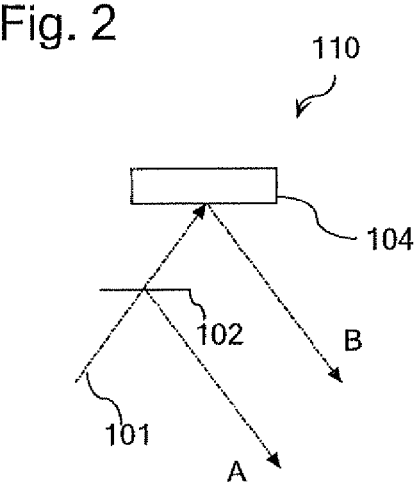
FIG. 2 is an illustration of a split and delay unit according to one or more embodiments of the present invention.

As illustrated in FIG. 2, the split and delay unit 110 may comprise a beam splitter 102, such as a 50/50 beam splitter, and a reflective surface 104, such as a fully reflective mirror. A portion of the incoming optical signal 101 is reflected off of the beam splitter 102 to form a first sub-beam A. A portion of the incoming optical signal 101 is transmitted through the beam splitter 102 and is reflected off of the fully reflective mirror 104 to form a second sub-beam B. Because sub-beam B travels an optical path that is longer than the optical path traveled by sub-beam A, there is an optical path length difference l between the two sub-beams. According to this exemplary embodiment, it is possible to adjust the separation between the two sub-beams by adjusting the angle of incidence of the incoming beam.

Figure 3:
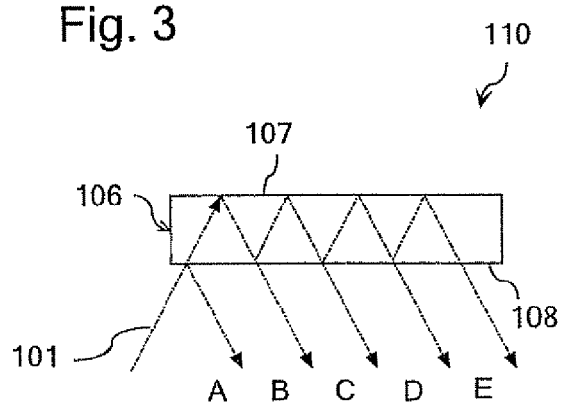
FIG. 3 is an illustration of a split and delay unit according to one or more embodiments of the present invention.

FIG. 3 illustrates an exemplary embodiment that utilizes a plane-parallel plate 106 as the split and delay unit 110. The plane-parallel plate 106 may provide multiple parallel sub-beams (sub-beams A-E). An incoming optical signal 101 is incident upon a beam splitting face 108 of the plane-parallel plate 106 wherein a portion of the incoming optical signal 101 is reflected to form sub-beam A. A portion of the incoming optical signal 101 is also transmitted through the beam splitting face 108 where it is then reflected off of reflective rear wall 107. A portion of this reflected sub-beam is transmitted through beam splitting face 108 to form sub-beam B. Because sub-beam B travels a longer distance than sub-beam A, there is an optical path length difference l between the two sub-beams. As illustrated in FIG. 3, the process is repeated along the plane-parallel plate 106 where additional sub-beams are formed in the same manner (sub-beams C, D, and E). There is an optical path length difference l between each adjacent sub-beam (e.g., between sub-beam A and sub-beam B, between sub-beam B and sub-beam C, etc.).

Figure 4:
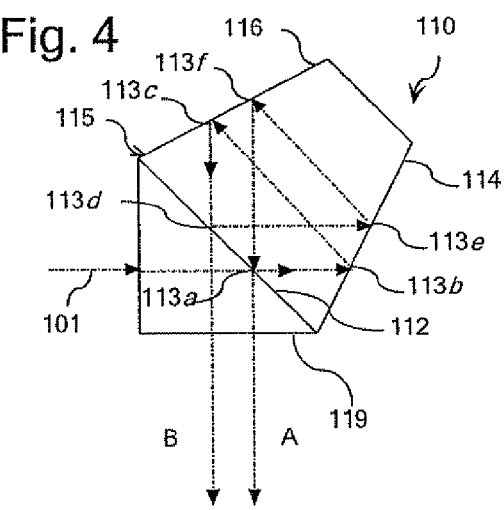
FIG. 4 is an illustration of a split and delay unit according to one or more embodiments of the present invention.

FIG. 4 illustrates an exemplary split and delay unit 110 that comprises a trapezoidal cross-section prism 115 and a triangular cross-section prism 119. The two outwardly facing sides of the triangular cross-section prism 119 are anti-reflection coated, while the two side walls 114 and 116 of the trapezoidal cross-section prism 115 are coated for full reflection. The sides of the triangular cross-section prism 119 and trapezoidal cross-section prism 115 that are adjacent to one another at beam splitting surface 112 are coated such that a portion of the optical signal 101 beam power is reflected, and a portion of the optical signal 101 beam power is transmitted. Many other variations of the exemplary embodiment illustrated in FIG. 4 are possible. For example, the triangular cross-section prism 119 is not required and may be replaced by a thin-film coating on the beam splitting surface 112 that has partial beam reflecting properties. The trapezoidal cross-section prism 115 may also not be trapezoidal but any shape that allows for the beam to be reflected twice before returning to the beam splitting surface 112.

As shown in the exemplary split and delay unit 110 illustrated in FIG. 4, the incoming optical signal 101 may be incident upon the beam splitting surface 112 at a position 113a such that at least one of two sub-beams will travel at least one round trip within the prism 115. As the optical signal 101 reaches the beam splitting surface 112, a portion of the optical signal 101 is reflected to form a first sub-beam A at point 113a. A portion of the optical signal 101 is also transmitted through the beam splitting surface 112 and travels a first round trip portion that is defined by a reflection off of side wall 114 at point 113b, a reflection off of side wall 116 at point 113c and a return to the beam splitting surface 112 at point 113d. Here, a portion of this first transmitted portion is transmitted through the beam splitting surface 112 at point 113d to form a second sub-beam B. Therefore, sub-beam B comprises a portion of the optical signal 101 that is transmitted through the beam splitting surface 112 at point 113a after traveling a first round trip portion.

Next, another portion of the optical signal 101 is reflected off of the beam splitting surface 112 at point 113d following the first round trip and travels a second round trip that is defined by a reflection off of side wall 114 at point 113e, a reflection off of side wall 116 at point 113f and a return to the beam splitting surface 112 at point 113a. A portion of this signal is then transmitted through the beam splitting surface to add to sub-beam A. These reflections repeat such that sub-beam A comprises a reflected portion of the optical signal 101 and a plurality of second round trip portions, and sub-beam B comprises a plurality of first round trip portions. The separation between sub-beam A and sub-beam B may be adjusted by translating the split and delay unit 115 up or down such that position of the point of incidence 113a is changed along the beam splitting surface 112.

The power of each sub-beam may be calculated and modified. Upon the first reflection at point 113a, a portion of the power of the optical signal 101 (represented by x) will be reflected into sub-beam A. After the first round trip, a portion of (1-x)(1-x) will be transmitted into sub-beam B, and after the second round trip a portion of x(1-x)(1-x) will be transmitted into sub-beam A, and so on. Assuming no loss on reflections or propagation within the cross-section prism 115, and that all of the sub-beams add in phase, the total power in sub-beam A may be defined as:

$$A = x(1 + (1-x)^2(1 + x^2 + x^4 + x^6 + \ldots )), \quad (1)$$
$$= x\left(1 + \left(\frac{1-x}{1+x}\right)\right)$$
$$= \frac{2x}{1+x}$$

According to the same assumptions, the total power in sub-beam B may be defined as:

$$B = (1-x)^2(1 + x + x^4 + x^6 + \ldots ), \quad (2)$$
$$= \frac{(1-x)^2}{1-x}$$
$$= \frac{1-x}{1+x}$$

To achieve maximum speckle contrast reduction, the perceived intensity of each sub-beam should be equal. The two equations may be solved to ensure that sub-beam A and sub-beam B have the same power (i.e., equal to approximately one half of the original optical signal 101 power if the embodiment splits the optical signal 101 into two sub-beams). According to the exemplary embodiment illustrated in FIG. 4, the reflection power of x should be ⅓ or 33.3% and therefore the beam splitting surface 112 should be configured accordingly. To accommodate any loss that may be present within the split and delay unit 110, the optimum first reflection strength may be slightly adjusted to produce equal power in both sub-beams. Because the sub-beams travel in a material other than air in this embodiment, the optical path length difference l between sub-beam A and sub-beam B exiting after each consecutive round trip and reflection is equal to the physical length of the round trip within the trapezoidal cross section prism l multiplied by the refractive index of the material of the prism n such that l=l×n.

Figure 5:
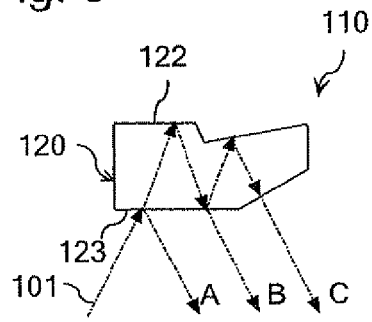
FIG. 5 is an illustration of a split and delay unit according to one or more embodiments of the present invention.

Other embodiments may comprise split and delay units 110 that produce more than two parallel sub-beams. The exemplary embodiment illustrated in FIG. 5 is a split and delay unit 110 that comprises a prism 120 in which an optical signal 101 is transmitted and reflected by beam splitting surface 123 and reflective surface 122 that are positioned and configured to produce parallel sub-beams A, B and C. The exemplary embodiment of FIG. 6 comprises a triangular cross-section 124 prism and a semi-rectangular cross-section prism 125. A portion of optical signal 101 is reflected off of beam splitting surface 126 to form sub-beam A, while a portion of optical signal is transmitted through the beam splitting surface 126 and reflected off of reflective coated side walls 128, 130 and 132 before reaching the beam splitting surface. A portion of this beam is transmitted through the beam splitting surface 126 to form sub-beam B, while a portion of this beam is reflected off of the beam splitting surface 126 and reflected off of reflectively coated side walls 128, 130 and 132. This portion of the optical signal then exits the unit as sub-beam C.

Figure 6:
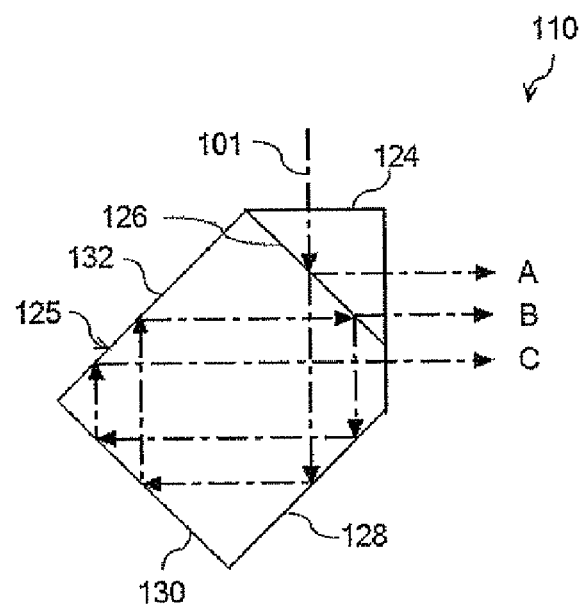
FIG. 6 is an illustration of a split and delay unit according to one or more embodiments of the present invention.

The embodiments of FIGS. 5 and 6 may produce more or fewer sub-beams by translating the split and delay units 110 left or right with respect to the optical signal 101. Equal sub-beam strength for sub-beams A, B and C may be achieved by using variable strength reflective coatings on the various surfaces of the split and delay unit 110. For example, if no variable strength coating is used within the exemplary split and delay units of FIGS. 5 and 6, and 38.2% of the signal is reflected first off of the beam splitting surface, sub-beams A, B and C will have 0.382, 0.382 and 0.236 of the original beam power, respectively.

Figure 7A:
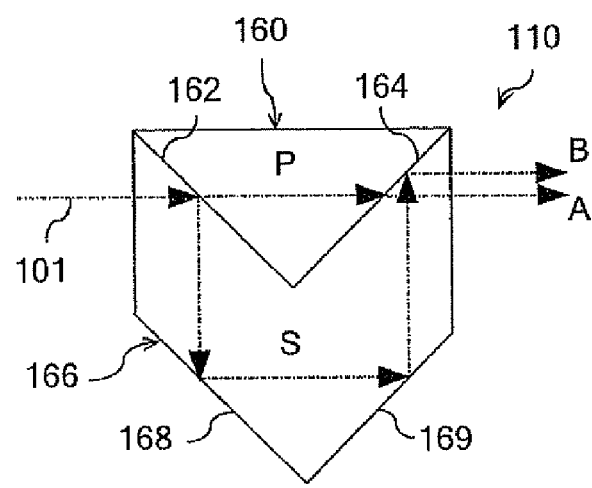
FIG. 7a is an illustration of a split and delay unit according to one or more embodiments of the present invention.

A laser projection system may require a split and delay unit that allows for one or more optical signals (i.e., input beams) to be split, delayed and recombined into a pair or pairs of parallel offset beams having a separation less than the diameter of a beam spot generated by a sub-beam, such as a laser projection system operating with an expanded beam some distance from the beam waist. The embodiment of FIG. 7a illustrates a polarization split and delay unit 110 that utilizes two prisms 160, 166 to create a first and second beam splitting surface 162, 164. The first beam splitting surface 162 reflects and delays a portion of the optical signal 101 having one polarization state (e.g., an S polarization state) and transmits a portion of the optical signal having another polarization state (e.g., a P polarization state). The reflected and delayed sub-beam B is then reflected and recombined with the transmitted sub-beam A by the second beam splitting surface 164. The input polarization should provide for equal power between polarization states. The polarization state of the sub-beams may be different, even orthogonal, without impacting the speckle reduction, provided that the screen is depolarizing.

The polarization split and delay unit may comprise two mirror surfaces 168 and 169, which may be offset to provide for a lateral offset between the P and S sub-beams upon exit of the split and delay unit 110. More specifically, the two mirror surfaces 168 and 169 are offset from a position that would provide for the two beams to recombine with perfect centering. The offset of the mirrors may be modified according to the desired offset between the sub-beams. Further, the recombination may be achieved with an offset of any magnitude compared to the beam diameter. This embodiment allows for the beams to be projected and focused so that they may be separated at the projection surface, and it also provides for a favorable geometry and an arbitrarily small offset without blocking any beams.

Figure 7B:
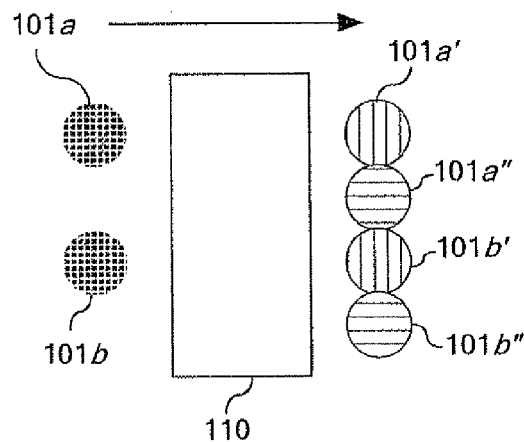
FIG. 7b is an illustration of an implementation a split and delay unit according to one or more embodiments of the present invention.
Figure 7C:
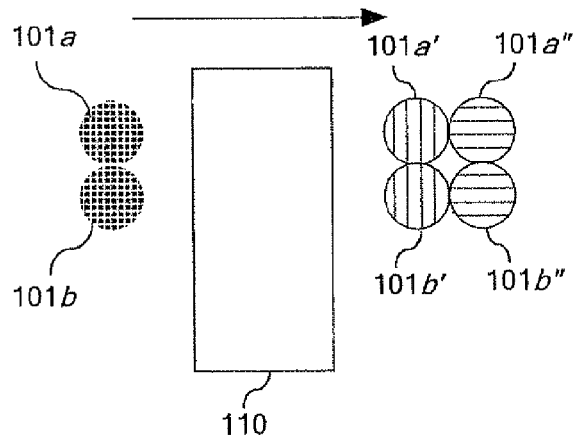
FIG. 7c is an illustration of an implementation a split and delay unit according to one or more embodiments of the present invention.
Figure 7D:
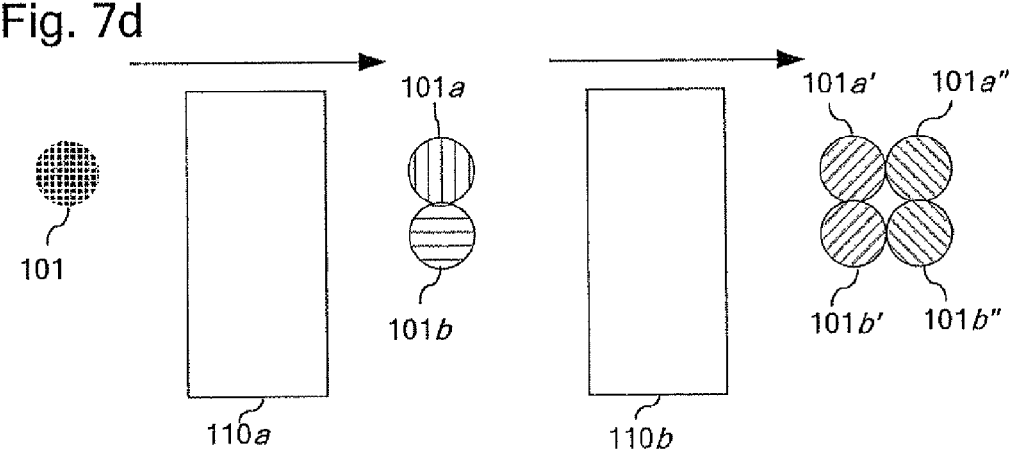
FIG. 7d is an illustration of an implementation a split and delay unit according to one or more embodiments of the present invention.

The polarization split and delay unit 110 may be used to generate more than two sub-beams. For example, FIG. 7*b* illustrates an implementation of the polarization split and delay unit 110 in which two optical signals 101*a* and 101*b* are incident upon the polarization split and delay unit 110. After passing through the polarization split and delay unit 110, the two input beams 101*a* and 101*b* are split into sub-beams 101*a*', 101*a*'' and 101*b*', 101*b*'', respectively. The optical signals and sub-beams are depicted in FIGS. 7*b*-*d* as circles which ultimately generate beam spots on a projection surface. As described above and illustrated in FIG. 7*a*, this implementation creates a vertical set of sub-beams that may be perpendicular to a scan line direction if the split and delay unit 110 is implemented into a scanning laser projection system.

FIG. 7*c* illustrates another implementation of the polarization split and delay unit 110 in which two optical signals 101*a* and 101*b* are incident upon the first beam splitting surface 162. In this implementation, the two optical signals 101*a* and 101*b* are incident side by side upon the polarization split and delay unit 110, which is rotated 90° from the position illustrated in FIG. 7*a*. Therefore, optical signal 101*a* is split into two sub-beams 101*a*' and 101*a*'', which are arranged horizontally, or in an arrangement parallel to the scan line direction if implemented into a scanning laser projection system. Similarly, optical signal 101*b* is also split into two sub-beams 101*b*' and 101*b*''. Thus, the square shaped sub-beam arrangement of FIG. 7*c* may be achieved.

The four sub-beam arrangement of FIG. 7*c* may be created from a single optical signal 101 using two polarization split and delay units. FIG. 7*d* illustrates an embodiment that utilizes two polarization split and delay units 110*a*, 110*b* to achieve four beams from a single optical signal 101. The optical signal 101 is incident upon a first polarization split and delay unit 110*a* where it is split into sub-beams 101*a* and 101*b*, as illustrated and described in FIG. 7*a*. Sub-beams 101*a* and 101*b* are then incident upon a second polarization split and delay unit 110*b*, which is rotated as described and illustrated in FIG. 7*c*. The second polarization split and delay unit 101*b* splits sub-beam 101*a* into sub-beams 101*a*' and 101*a*'', and sub-beam 101*b* into sub-beams 101*b*' and 101*b*''. Note that the polarization axes for the second polarization split are 45° to those for the first polarization split. This process may be continued indefinitely, with suitable arrangements of polarization splitters, doubling up the number of sub-beams at each polarization splitter.

To generate the requisite orthogonal optical modes for speckle reduction described above, the optical signal 101 of the laser 30 is modulated such that it changes sequentially through a set of wavelengths $\lambda_m = \lambda_0 + m\Delta\lambda$, where m is a positive integer from 0 to M−1 (M is the total number of modes generated) and $\lambda_0$ is the first wavelength of the set of generated wavelengths. Each wavelength is separated from the adjacent one by a wavelength difference $\Delta\lambda$, which is selected such that $$\Delta\lambda = \frac{\lambda_0^2}{Ml}, \quad (3).$$

A new orthogonal optical mode is generated at each sequenced wavelength. To achieve maximum speckle reduction, each of the orthogonal optical modes that are generated in such a manner should persist for equal amounts of time, and the combined time to cycle through all of the optical modes that are generated should be less than the integration time of a camera or persistence time of the eye.

Different methods may be utilized to produce the required wavelength modulation or switching, and the method may depend on the type of laser 30 used in the laser projection system 100. A system controller 10 may be programmed to modulate the optical signal 101 by applying a wavelength modulation signal to the laser 30, for example. For example, a laser 30 may be a frequency doubled 1060 nm diode laser producing 530 nm (green) output, and the diode laser chip may be of a three-section DBR design having a phase section, a DBR (or wavelength selective) section and a gain section. The present inventors have recognized that the output wavelength of such a DBR laser can be made to vary either continuously or in steps equal to free spectral range (longitudinal mode spacing) by applying a wavelength modulation signal in the form of a variable bias to the DBR and/or phase tuning sections while keeping the gain section bias constant. The present inventors have also recognized that, when periodically rapidly resetting the laser gain section current to zero and back to the operating point, DBR lasers randomly select different longitudinal cavity modes which thereby oscillates the laser between multiple wavelengths. The wavelength modulation signal may be any type of signal, including, but not limited to square wave signals, saw toothed signals, sine wave signals and random signals such that the optical signal 101 switches or oscillates between multiple wavelengths $\lambda_m$ separated by $\Delta\lambda$. It is contemplated that speckle reduction may also be achieved by modulating the wavelength of the laser through more than the minimum range of $M\Delta\lambda$ (i.e., the wavelength may be modulated by multiples of $M\Delta\lambda$).

More specifically, the laser driver 20, which may be controlled by the system controller 10, may be configured to apply the wavelength modulation signal to the laser 30. For example, the laser driver 20 may be circuitry configured to produce the desired wavelength modulation signal. Typically, applying a high frequency AC bias to the phase section will result in a fast continuous modulation (sweeping) of the output wavelength with the amplitude dependent on the bias voltage (or current). Applying an AC bias to the DBR section will result in a laser 30 rapidly switching between two or more discrete wavelengths corresponding to the cavity modes (a phenomenon known as mode hopping), although this behavior may be dependent on a specific chip design. The same or nearly the same speckle reduction can be achieved if instead of changing the wavelength sequentially between M values (switching), the wavelength is continuously swept (oscillated) back and forth in a sinusoidal or saw-tooth fashion within the range that includes all of the wavelengths $\lambda_m$.

Wavelength modulation of a laser 30 according to the present invention may be performed very fast, on a nanosecond scale. For the example of a DBR laser, either the DBR section or the phase section may be modulated at rates approaching and even exceeding 1 GHz. As an example and not a limitation, when incorporating the present invention into an image projection system having an XVGA image (1024× 768 pixels) and a 60 Hz frame rate, the "pixel rate" is 47.2 MHz. Therefore, by applying the invention disclosed herein, the phase of the parallel sub-beams may change several times during the time period that corresponds to the display time of a single pixel. Pixels created by a laser projection system 100 may form a frame that is generated at a frame generation frequency. The wavelength modulation may also be greater than or equal to the frame generation frequency. As a result of the fast wavelength modulation, the present invention may be combined with other methods for speckle contrast reduction that rely on averaging within the response time of the eye or sensor, but work at a slower rate, to achieve a compounded effect. For example, the polarization state of the laser beams used for projection may be periodically changed and a depolarizing screen may be employed as the image projection surface 50.

When incorporating wavelength modulation, the split and delay unit 110 may be very small in size and therefore suitable for incorporation in a miniature projector, for example. For the split and delay unit 110 of only a few millimeters in size, the required $\Delta\lambda$ may be of an order of a few hundredths of a nanometer. If a frequency doubling crystal is used in the application, this size of wavelength modulation is well within a typical spectral acceptance bandwidth of a frequency doubling crystal, and will therefore not cause a significant change in the second harmonic conversion efficiency and laser 30 output power.

Referring once again to FIG. 4 for a two sub-beam example, it is assumed that when the wavelength is $\lambda_0$ (m=0), the optical path length of one round trip inside of the trapezoidal shaped prism 115 is exactly equal to an integer multiple of $\lambda_0$, and it also may be neglected that there may be a small difference of the first and second round trip lengths that contribute to sub-beam A and second sub-beam B, as described above. For $\lambda_0$, all of the round trip portions exiting the split and delay unit 110 are in phase, and therefore, sub-beam A and sub-beam B are in phase and have equal power. However, when the wavelength of the optical signal 101 is changed and equal to $\lambda_0+\Delta\lambda$ (i.e., $\lambda_1$ when m=1), the light is delayed by a half-wave on each round trip. Therefore, all of the second round trip portions contributing to sub-beam A add in phase, as do all of the first round trip portions contributing to second sub-beam B. As a result, sub-beam A and sub-beam B have equal power but have a phase difference of $\pi$ between each other.

Figure 8:
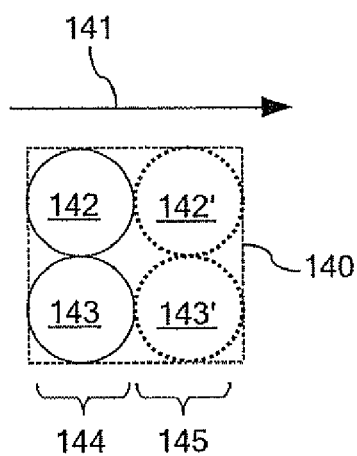
FIG. 8 is an illustration of two sub-beams scanned across an area according to one or more embodiments of the present invention.

FIG. 8 illustrates an area equivalent to one pixel 140 projected onto the screen 50, which is smaller than an eye resolution element. Embodiments of the present invention may be configured to create a set of two static beam spots 142, 143 positioned within the pixel 140 to form an illuminated area 144. In other embodiments, the set of sub-beams is scanned across the pixel in a scan line direction 141 to create two beam spots 142, 143 positioned perpendicularly with the scan line direction 141 (i.e., an imaginary line connecting the centers of the two beam spots 142, 143 that is perpendicular to the scan line direction 141). In this case, a first illuminated area 144 is formed, and then a second illuminated area 145 comprising beam spots 142' and 143' is created as the sub-beams are scanned across the pixel 140. In this illustrated embodiment, the illuminated areas 144, 145 should be one half or less than the eye resolution element. As the two-beams traverse the area of the pixel 140, four independent speckle patterns will be produced: two at illumination area 144 with the sub-beams first being in phase and then having a phase difference of $\pi$, and two at illumination area 145 with the sub-beams first being in phase and then having a phase difference of $\pi$.

As described herein, because the change between the two or more speckle patterns occurs on a time scale that is much faster than the response time of the eye, an average speckle contrast reduction of approximately $1/\sqrt{2}$ for the static two sub-beam embodiment of may be achieved. However, when the sub-beams are scanned across the pixel 140 to form two illumination areas (k=2), the two positions and the two orthogonal optical modes equate to four speckle patterns in total. The amount of speckle contrast reduction may be expressed as $1/\sqrt{kS}$. Therefore, the contrast will be reduced by ½ in the embodiment illustrated in FIG. 8. To obtain the greatest speckle contrast reduction, the combined area illuminated by the parallel sub-beams should be less than the eye resolution (such as the resolution for a human eye or a sensor) for a given distance to the screen so that to the eye the individual spots appear as one illuminated spot.

For maximum speckle reduction, the optical modes that are generated must be orthogonal. The condition of orthogonality as defined here means that the modes produce statistically independent speckle patterns when illuminating the same area on the screen. As shown herein below, orthogonality requires a specific phase difference between parallel sub-beams forming an optical mode, which is dependent on the number of sub-beams and determines the required wavelength difference $\Delta\lambda$ and corresponding optical path length difference l. Speckle contrast reduction of $1/\sqrt{S}$ may be achieved by cycling through sets of appropriate phases for the sub-beams, where S is the total number of sub-beams, or the total number of spots generated by the sub-means. Each set of phases constitutes a different orthogonal optical mode. Each sub-beam number s (s is an integer from 1 to S) will generate a speckle amplitude at the eye of $e^{i\phi_{sm}}A_s$, where $\phi_{sm}$ is the phase of sub-beam number s for the mode number m (m is an integer from 0 to M−1, where M is the number of modes). When the total area illuminated is within one pixel, which is within one projected eye resolution area, the amplitude from all sub-beams S may be summed to give the perceived intensity of the pixel:

$$I_m = \left| \sum_{s=0}^{S-1} e^{i\varphi_{sm}} A_s \right|^2, \qquad (4)$$

Expanding equation (4) the following is obtained:

$$I_m = \sum_{s=0}^{S-1} |A_s|^2 + \sum_{s'>s}^{S-1} \sum_{s=0}^{S-2} (e^{i(\varphi_{s'm} - \varphi_{sm})} A_{s'} A_s^* + e^{-i(\varphi_{s'm} - \varphi_{sm})} A_{s'}^* A_s), \qquad (5)$$

Because the sub-beam phases may be reconfigured rapidly, so that a large number of different sets of phases (each set of phases representing an optical mode) can be sequenced within a persistence time of the human eye or the integration time of the camera sensor, and assuming all sets of phases (modes) persist for the same length of time, the average perceived intensity may be expressed as:

$$\bar{I} = \frac{1}{M} \sum_{m=0}^{M-1} I_m = \quad (6)$$

$$\sum_{s=0}^{S-1} |A_s|^2 + \frac{1}{M} \sum_{m=0}^{M-1} \sum_{s'>s}^{S-1} \sum_{s=0}^{S-2} (e^{i(\varphi_{s'm} - \varphi_{sm})} A_{s'} A_s^* + e^{-i(\varphi_{s'm} - \varphi_{sm})} A_{s'}^* A_s),$$

The above equation may be simplified by assuming that the phases $\phi_{sm}$ may be selected so that the second term in (6) is identically zero. In this case, the perceived intensity is expressed as:

$$\bar{I} = \sum_{s=0}^{S-1} |A_s|^2, \quad (7)$$

Additionally, by assuming that the screen surface roughness function for any spot produced by the sub-beam number s is uncorrelated with the screen roughness function for any other spot, the average (perceived) intensity is the average of S independent intensities with the same average. Thus the speckle contrast is reduced by $1/\sqrt{S}$. Note that equation (7) does not require that the average amplitudes of each spot be identical. However, the full reduction of speckle contrast will only apply when they are identical.

If the total number of sub-beams S is less than or equal to the total number of optical modes M, the second term in equation (6) can be made equal to zero by choosing the phases such that:

$$\phi_{sm} = \phi_0 + (2\pi sm/M), \quad (8)$$

The total number of sub-beams S cannot exceed the total number of modes M because then $\phi_{sm}$ would be identical for s and s+M. With this choice of phases, the sum in the second term in equation (6) becomes:

$$\sum_{m=0}^{M-1} \sum_{s'>s}^{S-1} \sum_{s=0}^{S-2} \left( e^{2\pi i(s'-s)m/M} A_{s'} A_s^* + cc \right) = \quad (9)$$

$$\sum_{s'>s}^{S-1} \sum_{s=0}^{S-2} \sum_{m=0}^{M-1} \left( e^{2\pi i(s'-s)m/M} A_{s'} A_s^* + cc \right),$$

Here "cc" denotes the complex conjugate. Focusing on a particular element of the sum of (9):

$$\sum_{m=0}^{M-1} e^{2\pi i m/M} A_{s'} A_s^* = A_{s'} A_s^* \sum_{m=0}^{M-1} e^{2\pi i m/M} = A_{s'} A_s^* \sum_{m=0}^{M-1} z_m, \quad (10)$$

The M $z_m$ in equation (10) are the Mth roots of 1, such that:

$$z^M - 1 = 0 = \prod_{m=0}^{M-1} (z - z_m), \quad (11)$$

Since the linear term in the expansion of the right-hand side of equation (11) is zero, the M roots must add to zero. Note also that for k<M:

$$\sum_{m=0}^{M-1} e^{2\pi i k m/M} = 0, \quad (12)$$

Thus, with the prescribed choice for the phase of mode number m and sub-beam number s$\phi_{sm}$ in equation (7), the speckle contrast may be reduced by $1/\sqrt{S}$. Equation (8) prescribes a set of phases which is consistent with the generation of multiple delayed beams. The phase delay of the beam will be proportional to the wavelength, so that if the modes are generated by cycling through a set of wavelengths $\lambda_m = \lambda_0 + m\Delta\lambda$, and there is a path length difference of s×l for sub-beam s, then the following phases are obtained:

$$\varphi_{sm} = \frac{2\pi sl}{\lambda_0 - m\Delta\lambda} \approx \frac{2\pi sl(\lambda_0 + m\Delta\lambda)}{\lambda_0^2} = \varphi_0 + 2\pi sm \frac{l\Delta\lambda}{\lambda_0^2}, \quad (13)$$

For consistency with equation (8) to make the second term of equation (6) zero, the required optical path length difference may be determined by:

$$l = \frac{\lambda_0^2}{M\Delta\lambda}, \quad (12)$$

Therefore, the speckle contrast for a projection system may be reduced by generating an array of sub-beams whose phases are independently changed to cover a set of orthogonal optical modes. For S sub-beams, the speckle contrast reduction may be as high as $1/\sqrt{S}$ in embodiments where the illumination intensities of all spots are equal, only one illumination area is generated, and the phase of a sub-beam s for a mode m is $\phi_0 + 2\pi sm/M$. Although the cycling of phases are described sequentially herein, an equal level of speckle reduction may be achieved by randomly varying the phase of the sub-beams rather than deterministically (i.e., m is randomly varied rather than incrementally varied by applying a random noise to the laser system, for example).

As an example and referring again to FIG. 8, the two sub-beams generating beam spots 142 and 143 are in phase for the first optical mode, and have a phase difference of $\pi$ for the second optical mode. The same two modes will be projected to a new area within a pixel and illuminate spots 142' and 143' when the sub-beams are scanned (moved) along the scan line Thus, the four speckle patterns are created that are statistically independent, and an average speckle contrast reduction of approximately $1/\sqrt{4}$, or ½, may be achieved when the beams are scanned across the pixel 140, as described above.

Figure 9:
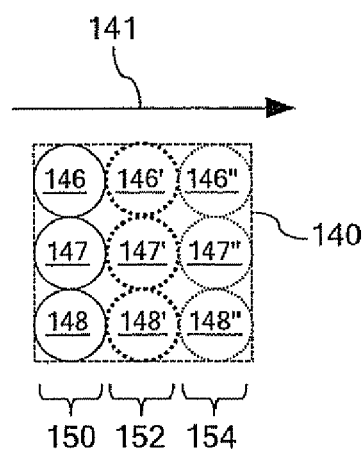
FIG. 9 is an illustration of three sub-beams scanned across an area according to one or more embodiments of the present invention.

Similarly, as illustrated in FIG. 9, a set of three parallel sub-beams can be produced by using split and delay units 110 of FIGS. 5 and 6, for example. This set will generate three beam spots 146, 147 and 148 within a pixel area on the screen, forming a first illumination area 150. While the three sub-beams are illuminating the first illumination area 150, the laser source is made to cycle through three orthogonal optical modes (M=3). This cycling achieves a speckle contrast reduction of $1/\sqrt{3}$. Applying the condition of orthogonality, $\phi_{sm} = \phi_0 + 2\pi sm/M$, it is shown for an embodiment producing three beam spots that phase difference between the sub-beams for the first orthogonal optical mode is $0\pi$, the phase difference between the sub-beams for the second orthogonal optical mode is $2\pi/3$, and the phase difference between the sub-beams for the third orthogonal optical mode is 4π/3. More specifically, as an example, the phase of the sub-beams generating beam spots 146 (s=1), 147 (s=2) and 148 (s=3) is $\phi_0$, $\phi_0$, and $\phi_0$ during the time the first optical mode (m=0) is projected, $\phi_0+2\pi/3$, $\phi_0+4\pi/3$, and $\phi_0+6\pi/3$ during the time the second optical mode (m=1) is projected, and $\phi_0+4\pi/3$, $\phi_0+8\pi/3$, and $\phi_0+12\pi/3$ during the time the third optical mode (m=2) is projected, correspondingly.

These beam spots may traverse the pixel 140 along scan line direction 141 by the scanning of the corresponding sub-beams to form illumination areas 152 and 154. An additional speckle contrast reduction of $1/\sqrt{3}$ may be achieved by this scanning of the sub-beams for a total speckle contrast reduction of $1/\sqrt{9}$, or ⅓, where the three mode-cycled sub-beams are of equal strength. The cycle time must be short compared to the time to scan from the left side of the pixel to the center, or from the center to the right, assuming a left-to-right scan. Scan direction 141 may be in any direction, and not just from left to right as illustrated. According to the embodiment, the size of the individual illumination areas 150, 152 and 154 should be ⅓ or less of the eye resolution. The spots may be positioned so that they partially overlap one another. However, overlapping may decrease the amount of speckle contrast reduction because the speckle patterns produced with the sub-beams having phase differences corresponding to the orthogonal optical modes will not be fully independent.

In raster scanning laser projection applications, for example, a significant amount of speckle contrast reduction may be achieved. Projectors outputting red, green and blue laser beams scanned in vertical and horizontal directions by micro-mirrors are collimated to have a minimum beam waist size at a certain distance from a projector (e.g., 0.5 meters). At larger distances, the beam waist size will increase, but at a rate slower than the increase in the overall size of a projected image. As a result, for a screen positioned from 0.5 meters to a much larger distance from the projector, the image that is projected will appear to be perfectly in focus with no need for adjustments. Therefore, the parallel sub-beams produced by the split and delay unit 110 and wavelength modulation signal will keep the collimation properties of the original optical signal 101 and the nearly infinite depth of focus may be preserved. The sub-beams will illuminate different areas on the screen, and therefore different and statistically independent speckle patterns will be produced when the beams are sequenced through the orthogonal optical modes.

It is noted that terms like "usually," and "typically," if utilized herein, should not be read to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "approximately" is utilized herein to represent the inherent degree of uncertainty that may be attributed to any quantitative comparison, value, measurement, or other representation. The term "approximately" is also utilized herein to represent the degree by which a quantitative representation may vary from a stated reference without resulting in a change in the basic function of the subject matter at issue.

It is noted that recitations herein of a component of the present invention being "programmed" in a particular way, "configured" or "programmed" to embody a particular property, or function in a particular manner, are structural recitations as opposed to recitations of intended use. More specifically, the references herein to the manner in which a component is "programmed" or "configured" denotes an existing physical condition of the component and, as such, is to be taken as a definite recitation of the structural characteristics of the component.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A method of operating a laser source, the method comprising:
   generating a plurality of sub-beams that define an optical mode, wherein the plurality of sub-beams carry common projection data; and
   controlling the phase of selected ones of the sub-beams to continuously sequence the laser source through a plurality of orthogonal optical modes, thereby reducing speckle contrast in an image projected using the laser source,
   wherein a set of the plurality of beam spots form an illuminated area within a common image field pixel and the plurality of sub-beams are scanned across the common image field pixel in a scan direction producing plurality of illuminated areas and the laser source is sequenced through the plurality of orthogonal optical modes at each illuminated area.

2. A method as claimed in claim 1 wherein the plurality of sub-beams are projected to produce a plurality of corresponding beam spots within a common image field pixel having an area less than or equal to an eye resolution element.

3. A method as claimed in claim 1 wherein the plurality of beam spots are arranged perpendicularly to the scan direction.

4. A method as claimed in claim 1 wherein the number of orthogonal optical modes through which the laser is sequenced is equal to the number of sub-beams generated for each mode.

5. A method as claimed in claim 1 wherein the phase of a selected sub-beam s at an optical mode m is controlled such that:

$$\varphi_{sm} = \varphi_0 + \frac{2\pi sm}{M},$$

where:
   $\phi_{sm}$ is the phase of the selected sub-beam s at an optical mode m,
   $\phi_0$ is an originating phase of the sub-beam,
   M is the total number of optical modes,
   s is a positive integer from 1 to S, where S is the total number of beam spots, and
   m is a positive integer from 0 to M−1.

6. A method as claimed in claim 1 wherein the laser source comprises a laser configured to generate an optical signal, and the plurality of orthogonal optical modes are generated by:
   splitting the optical signal into the plurality of sub-beams,
   creating an optical path length difference l between each individual sub-beam, and
   modulating the wavelength of the optical signal over a set of modulation wavelengths comprising $\lambda_0+m\Delta\lambda$, where:
   $\lambda_0$ is a native wavelength of the optical signal, m is a positive integer from 0 to M−1, where M is the total number of orthogonal optical modes, and Δλ is a wavelength difference between each modulation wavelength.

7. A method as claimed in claim 6 wherein the optical signal alternates emission discretely at the modulation wavelengths, or continuously sweeps back and forth across the modulation wavelengths.

8. A method as claimed in claim 6 wherein the wavelength difference Δλ is determined by:

$$\Delta\lambda = \frac{\lambda_0^2}{Ml}.$$

9. A method as claimed in claim 6 wherein:
the plurality of sub-beams are scanned across a plurality of image pixels at an image pixel rate;
the plurality of image pixels are arranged to define an image frame on a projection surface that occurs at an image frame rate; and
the wavelength of the optical signal is modulated at a frequency that is greater than or equal to the image frame rate divided by the number of modes M such that each successive frame is projected using a different mode.

10. A method as claimed in claim 9 wherein the wavelength of the optical signal is modulated at a frequency that is greater than or equal to the image pixel rate multiplied by the number of modes M, such that the optical signal changes through M modes within each pixel.

11. A method as claimed in claim 6 wherein:
the laser comprises a phase control section, a wavelength selective section and a gain section; and
the wavelength of the optical signal is modulated by applying a wavelength modulation signal to the phase control section or the wavelength selective section of the laser.

12. A method as claimed in claim 1 wherein the laser source comprises:
a laser configured to generate at least one optical signal; and
at least one split and delay unit configured to split the optical signal into the plurality of sub-beams and to create an optical path length difference l between each individual sub-beam.

13. A method as claimed in claim 12 wherein the optical path length difference l is defined by l×n, where l is a physical length of one round trip within the split and delay unit and n is the refractive index of the split and delay unit.

14. A method as claimed in claim 12 wherein the method further comprises adjusting a separation between adjacent sub-beams by altering the position or the angle at which the optical signal is incident upon the beam splitting surface.

15. A method as claimed in claim 12 wherein the split and delay unit comprises at least one beam splitter and at least one reflective surface such that a portion of the optical signal is reflected off of the beam splitter, and a portion of the optical signal is transmitted through the beam splitter and reflected off of the reflective surface.

16. A method as claimed in claim 15 wherein:
the at least one beam splitter comprises a first and second polarization beam splitting surface configured to transmit a portion of the optical signal having a first polarization state and reflect a portion of the optical signal having a second polarization state;
the at least one reflective surface comprises a first and second mirror;
the reflected portion is reflected by the first polarization beam splitting surface, the first and second mirrors, and the second polarization beam splitting surface; and
the first and second mirrors are offset such that the transmitted and reflected portions of the optical signal exit the split and delay unit as two parallel sub-beams having a separation therebetween.

17. A method as claimed in claim 16 wherein the separation is less than the diameter of the two parallel sub-beams.

18. A method as claimed in claim 12 wherein the split and delay unit comprises a plane-parallel plate.

19. A method as claimed in claim 12 wherein the split and delay unit comprises one or more beam splitting prisms having at least one beam splitting surface and a plurality of reflective prism walls.

20. A method as claimed in claim 12 wherein the split and delay unit is further configured as a trapezoidal cross-section prism comprising a beam splitting surface that is configured for partial reflection, and at least two prism walls that are configured for full reflection.

21. A method as claimed in claim 20 wherein the plurality of sub-beams comprise a portion of the optical signal reflected off of the beam splitting surface and portions of the optical signal traveling a plurality of round trips within the split and delay unit.

22. A method as claimed in claim 20 wherein the split and delay unit further comprises a triangular cross-section prism positioned adjacent to the beam splitting surface.

23. A method as claimed in claim 20 wherein the split and delay unit further comprises a thin film coating on the beam splitting surface.

* * * * *